April 18, 1950 W. H. HARSTICK 2,504,261
SELF-WASHING CREAM SEPARATOR
Filed June 24, 1946 2 Sheets-Sheet 1

Inventor
William H. Harstick
By Paul O. Pippel
Atty.

April 18, 1950 W. H. HARSTICK 2,504,261
SELF-WASHING CREAM SEPARATOR
Filed June 24, 1946 2 Sheets-Sheet 2

Inventor
William H. Harstick
By Paul O. Pippel
Atty.

Patented Apr. 18, 1950

2,504,261

UNITED STATES PATENT OFFICE 2,504,261

SELF-WASHING CREAM SEPARATOR

William H. Harstick, Oak Park, Ill., assignor to International Harvester Company, a corporation of New Jersey Application June 24, 1946, Serial No. 678,863

22 Claims. (Cl. 233—28)

This invention relates to a centrifugal separator and particularly to a type of separator used for separating whole milk. More specifically it relates to an improved construction for a self-washing cream separator.

During the development of the centrifugal cream separator it has been found necessary to devise separators wherein the washing of the separating bowl and its associated parts could be easily accomplished. Effective and positive washing of the cream separator is of exceptional importance to the dairy industry in view of the rapid and destructive growth of bacteria within the separating bowl after the separating operation is completed. In order to effectively wash the bowl and the parts contained therein, namely, the disks of the disk pack and the inner surfaces of the bowl, it was necessary to dismantle the bowl and individually wash the disks and the bowl parts in a cleaning solution.

The time necessary to complete this task often prompted the individual operator to use the cream separator a successive number of times without proper washing, thus effecting a high bacteria count in the cream and subsequent spoilage. The problem thus confronting the designers was to provide a type of self-washing cream separator. It has been found that effective washing can be obtained by pouring washing liquid into the separator bowl, rotating said washing liquid by the centrifugal action of the separating bowl and subsequently discharging or flushing the liquid from the bowl by means of valves, opening upon a predetermined lowering of the speed of rotation of the bowl. In order to secure such a flushing action it was necessary to provide a series of poppet valves at the inner periphery of the bowl, such valves normally being spring controlled. To accomplish a proper and complete washing of all the surfaces within the bowl, the surfaces had to be sloped toward the poppet valves thus in effect providing a series of circumferentially extending and converging conical bays toward the apex of which any of the slime adhering to the walls of the bowl would be carried toward the valves and thus discharged. It was found that constructions of this type were prohibitively expensive to manufacture and that the flushing action of the bowl was extremely difficult to control in view of the individual poppet valves. It is therefore applicant's prime object to provide a self-washing cream separator which will be simple and inexpensive to manufacture, yet positive and effective in operation.

It is another object of this invention to provide a self-washing cream separating bowl having improved valve means for discharging washing water, said valve means opening upon a predetermined speed of rotation of the separating bowl.

It is another object to provide a self-washing cream separator bowl having a plurality of separating disks, the inner peripheries of which form a cylindrical space which is substantially unrestricted, enlarged, and capable of receiving a substantial quantity of washing liquid so that the inner peripheries of the disks may be flushed clean by the centrifugal force of the bowl.

It is another object to provide a self-washing separating bowl being formed with sloping surfaces converging at a maximum internal periphery and a substantially continuous and circumferential extending discharge slot formed at said periphery.

It is another object to provide a continuous and freely positioned sealing ring for a separating bowl having a substantially continuous and circumferentially extending discharge opening at its maximum internal periphery.

It is still another object to provide a resilient and flexible sealing ring for a separating bowl of the self-washing type, said ring being formed with a plurality of projections abutting a substantially continuous discharge slot formed in the separating bowl.

It is another object to provide a self-washing separating bowl having a cream outlet positioned at the bottom thereof and means stationarily positioned at the bottom of said bowl for collecting the discharged cream.

It is still another object to provide an improved self-washing cream separating bowl wherein the bowl portions are formed with a substantially continuous flushing opening, resilient means for sealing said flushing opening, and a clamping ring connecting said bowl parts, said clamping ring being provided with a substantially continuous opening in alinement with said flushing opening.

Still another object is to provide an improved float construction for alternately supplying whole milk or washing water to a self-washing cream separating bowl.

A still further object is to provide a washing liquid supply valve, said valve also being adaptable for use as a float for regulating the feeding of whole milk to a separating bowl of the self-flushing type.

Other objects will become more readily apparent as the description proceeds when read in conjunction with the drawings, in which:

Figure 5 is a fragmentary elevational view showing an operating position of a milk metering valve.

Figure 6 is an enlarged end view taken along the line 6—6 of Figure 1.

Figure 1:
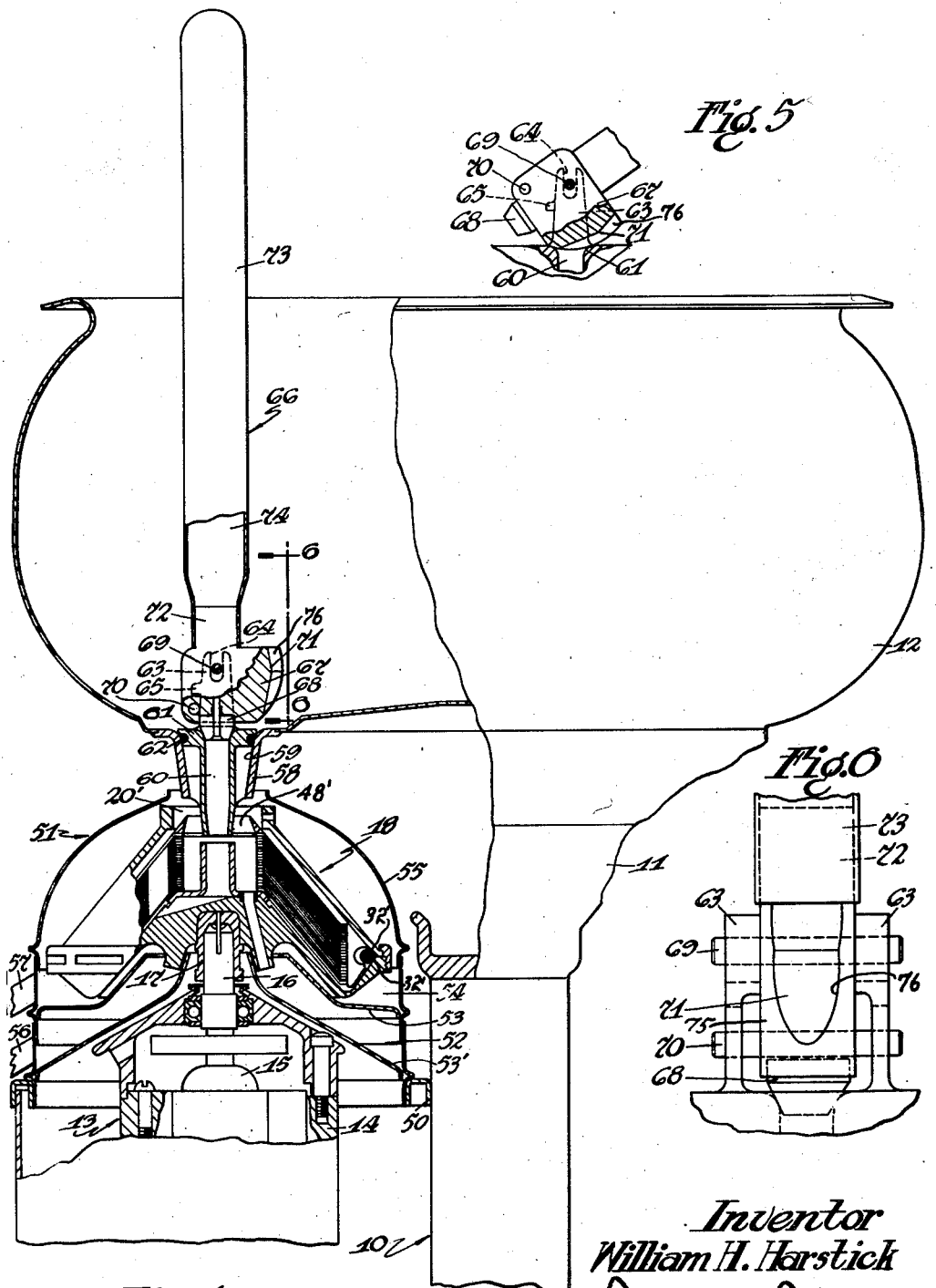
Figure 1 is a side elevational view of a cream separator having portion broken away to disclose pertinent parts of the invention.
Figure 2:
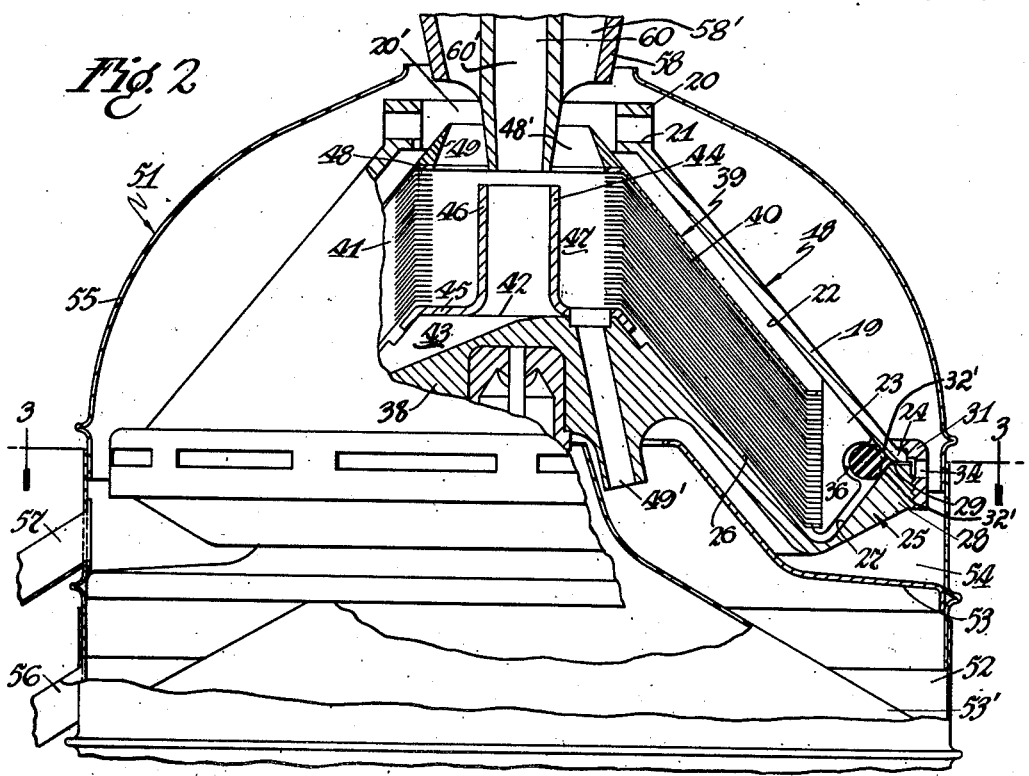
Figure 2 is an enlarged elevational view of a cream separator bowl having portions broken away to more clearly show its associated parts.
Figure 3:
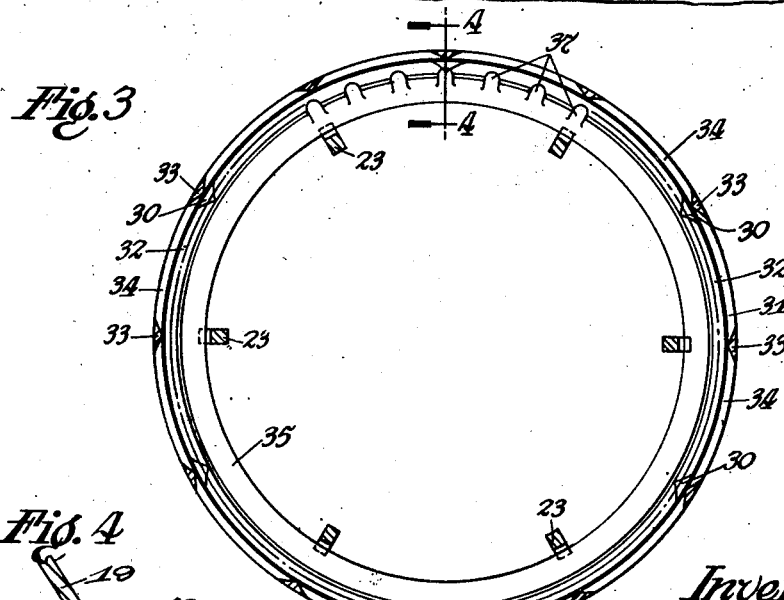
Figure 3 is a sectional view taken along the line 3—3 of Figure 2.
Figure 4:
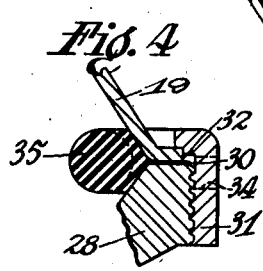
Figure 4 is a sectional view taken along the line 4—4 of Figure 3.

As shown in the drawings, the reference numeral 10 generally indicates a centrifugal separator supporting structure which includes a supply can support 11 on which is mounted a supply can 12. An electric motor 13 having a housing 14 is suitably supported on the supporting structure 10 and includes an armature 15 keyed on a rotatable shaft 16 projecting into a driving member 17 suitably fastened to the shaft 16.

A separator bowl is generally indicated at 18 and includes an upper half or shell portion 19 which is formed at its upper end with a collar 20 having an opening 20' and skim milk outlets 21. The shell portion 19 has an inner sloping surface 22 to which are connected a plurality of depending wing portions 23. An annular rim 24 is provided at the outermost part of the shell portion 19. A lower shell portion 25 is formed with inner sloping surfaces 26 and 27, the sloping surfaces 22 and 27 converging at a maximum internal periphery. The sloping surface 27 has a threaded rim portion 28 provided with an annular clamping surface 29. Extending upwardly from the clamping surface 29 are a plurality of diverging projections 30 effective to suitably space the clamping surface 29 from the rim 24 of the shell portion 19. A clamping ring 31 threaded on the rim portion 28 suitably connects the shell portions 19 and 25 together. The diverging projections 30 suitably space the shell portions apart so that a substantially continuous slot or discharge opening 32 is formed at the maximum internal periphery of the separating bowl 18. The sole function of these diverging projections 30 is to suitably space the shell portions apart and their number and size can be considerably varied, the most ideal condition existing when a completely free and unrestricted discharge opening is effected. The upper and lower shell portions 19 and 25 respectively are provided with annular sealing surfaces 32' adjacent to the discharge opening 32. The clamping ring 31 is formed with a plurality of diverging ribs 33 formed by milling out portions of said ring to provide a substantially continuous slot 34. The slot 34 is in alinement with and in direct communication with the discharge opening 32.

A resilient ring 35 of circular cross-section is positioned at the maximum internal periphery of the separating bowl 18. This ring is formed in one piece and is normally positioned adjacent to the discharge opening 32, and is adapted to be compressed against the sealing surfaces 32' by the centrifugal force as will hereinafter be described. The ring is seated in cut out portions 36 formed in the wing portions 23. A plurality of projections 37 are formed on the ring 35. The ring 35 and its projections may be made from any suitable resilient material such as rubber or synthetics, it being only necessary that it have a sufficient resiliency to permit expansion and contraction upon predetermined speeds of rotation of the separating bowl 18. The shell portion 25 is provided near its axis with a base section 38 which suitably supports a disk pack 39 having a stack of frusto-conical separating disks 40. The separating disks 40 are of conventional design and include three eccentric openings 41 only one of which is shown. The uppermost portion of the base section 38 is provided with a milk distributor 42 which has three distributor grooves 43 in communication with the eccentric openings 41.

A milk inlet tube 44 is positioned above the distributor 42 and axially alined therewith. This tube 44 includes a base 45 and a stem 46, the stem 46 extending upwardly to a point just below the top disk of the disk pack 39. A cylindrical space or axially extending annular space 47 is formed by the outer periphery of the tube 44 and the inner periphery of the separating disks 40. The space 47 is of substantial area and has a definite purpose which will be described presently. A closure disk 48 is provided at the top of the disk pack 39. The closure disk 48 is provided with a conical extension or funnel 49 which is secured thereto and which includes an opening 48' in communication with the space 47 and the discharge tube 58. A cream outlet tube 49' is formed in the base section 38 of the shell portion 25.

An annular channel 50 is connected to the supporting structure 10 and supports a stationary tinware or liquid collecting means generally designated by the reference character 51. A cream collecting chamber 52 is formed beneath the separating bowl 18 by means of annular plates 53 and 53'. A skim milk receiving chamber 54 is formed above the plate 53 and is closed by a cover member 55. A cream discharge spout 56 is in communication with the cream collecting chamber 52. A skim milk discharge spout 57 is in communication with the skim milk collecting chamber 54.

The milk supply can 12 is provided with a discharge tube 58 projecting downwardly from the can in axial alinement with the cylindrical space 47 of the separating bowl 18. An inner tapered surface 59 is formed in the discharge tube 58. A milk feed tube 60 of less cross-sectional width is axially positioned within the discharge tube 58 and projects downwardly therefrom, said milk feed tube normally being in communication with the milk inlet tube 44. The narrow width of the milk feed tube 60 divides the discharge tube into a washing liquid opening 58' and a milk supply opening 60'. The uppermost end of the milk feed tube 60 is provided with an annular enlarged shoulder portion 61 which has at its periphery a sealing ring 62. A pair of upstanding leg members 63 are connected to the milk feed tube 60, said legs having at their uppermost ends a pair of slots 64 and a pair of projections 65. A combined handle and float member generally designated at 66 is vertically positioned within the supply can 12 as best indicated in Figure 1. The float member 66 has at its end a portion forming a valve member 67 to which is connected a sealing member or plug 68 normally closing the milk feed tube 60 when said float member is in a vertical position. The valve member 67 is pivotally connected between the upstanding legs 63 by means of a pin 69 journaled in the slots 64. A transversely extending pin 70 is connected near the bottom of the valve member 67. The valve member 67 is provided with a spherical face 75. A vertically extending depression 76 is machined into the surface of the spherical face 75 to provide a metering surface 71. The depression 76 is of gradually increasing depth, the greatest depth being at the uppermost end of the member 67. Thus, as best shown in Figure 5, when the valve member 67 is initially rotated, only a small amount of liquid can course through the depression 76 into the milk feed tube 60, since the depression is substantially shallow at the lower end of the valve member and only a small metered opening is exposed. This opening is, of course, increased as the valve member is rotated about its horizontal axis, since the depth of the depression gradually increases until the maximum depth at the uppermost end of the valve member 67 is reached. Thus by rotating the valve member 67 in a clockwise direction, the amount of opening between the valve member and the milk feed tube is regulated and the flow of milk from the supply can 12 to the separating bowl 18 can be controlled in a manner such as will presently be more fully described in the operation. The valve member 67 has a portion 72 projecting into a tubular member 73. The tubular member 73 is closed at its uppermost end and is sealed at its lower end by the annular portion 72 thus providing an airtight chamber 74.

The operation is as follows:

The separating bowl 18 is rotated by means of the motor 13, and when a predetermined speed of rotation is reached the resilient ring 35, under the action of centrifugal force, expands sufficiently to be compressed against the sealing surfaces 32' and to close the discharge opening 32. When the separating bowl has reached its separating speed, the handle 73 is moved vertically until the sealing plug 68 is out of engagement with the inner walls of the milk feed tube 60. The handle 73 and the valve member 67 are rotated about a horizontal axis until the metering surface 71 is over the opening of the inlet tube 60. The whole milk thereupon flows down through said milk feed tube 60 into the milk inlet tube 44, through the distributor grooves 43, and thereupon into the disk pack whereupon the whole milk is properly separated. The handle 73 acts as a float, and as the milk level within the supply can 12 decreases, the valve member 67 is rotated toward the maximum open position whereby the metering surface 71 regulates the flow of milk so that a constant quantity of milk flow is obtained regardless of the milk level within the can. The valve member, in other words, compensates for the decrease in the pressure head resulting from the attendant fall of the milk level and thereby is effective to maintain a substantially constant flow of milk. Skim milk leaves the separating bowl through the openings 21 and the separated cream flows down through the cream outlet 49' and into the cream-collecting chamber 52.

The separator is now ready for washing. Washing liquid is introduced into the supply can 12, and the electric motor 13 is turned off. Upon a predetermined decrease in speed the resilient ring 35 will be pressed away from the discharge opening 32 by means of the projections 37. The bowl at this point is still rotating, though at a decreased speed. The handle 73 is thereupon moved upwardly and the pin 70 thereupon engages the projections 65 of the leg members 63. Further raising of the handle 73 by the operator thereupon causes the milk feed pipe 60 to move vertically away from the discharge tube 58 thereupon opening said tube and the washing liquid supply opening for communication with the interior of the supply can 12. The sealing plug 68 is thus also moved away from the milk feed tube 60 so that said tube by means of its milk supply opening is also in communication with the interior of the supply can. At this point of the operation, therefore, the operator has a hold on the handle 73 and has raised it vertically to a sufficient height. By so raising the handle the plug 68 is lifted away from the opening of the milk feed tube. In turn the shoulder portion 61 and sealing ring 62 are held out of sealing engagement with the discharge tube 58. Washing liquid thereupon descends through the discharge tube 58 through the opening 48' and into the cylindrical or annular space 47 formed between the inner peripheries of the disks and the milk inlet tube 44. The conical extension or funnel 49 on the closure disk 48 is so placed that a large quantity of washing water is supplied to the space 47. This space is thereupon filled and remains filled so that the washing water continues to be thrown between all the surfaces of the disks for washing them. It will be noted that in view of the small diameter of the outer peripheral surface of the milk inlet tube 44 with respect to the inner peripheral edges of the disks 40, the annular space 47 is substantially wide in a horizontal cross section. Thus the column of water which fills up this space is also wide or thick in a radial direction or in a horizontal cross section and a large quantity of washing liquid can be built up directly adjacent the inner peripheral edges of the disks. This liquid is of course thereupon forced outwardly between the disks due to the centrifugal action of the bowl. By providing the wide uninterrupted annular space sufficient washing liquid can be provided to the disks.

A sufficient space is allowed between the frustoconical extension and the upper bowl part so that the surface 22 and the upper surface of the closure disk 48 are cleansed by the water. A lesser amount of washing liquid descends through the milk feed tube 60, through the milk inlet tube 44 and through the distributor grooves 43.

The influx of water into the separating bowl further tends to slow down the bowl, and the valve ring 35 continues to remain away from the discharge opening 32, the opening 32 thereby being constantly open and permitting a radial discharge of the washing liquid due to centrifugal action. Since the energy required to rotate this incoming wash water is sufficient to considerably slow down rotation of the separating bowl, only a specific quantity of washing liquid is introduced at one time. The valve member 61 is intermittently opened and closed, and this operation is repeated several times so that a sufficient washing and flushing is accomplished. It will be noted that during the washing, the resilient ring 35 remains contracted and a continuous discharge is effected. A sufficient amount of wash water is intermittently fed to the separating bowl to slow down the bowl so that the discharge opening 35 at all times will remain open during the washing. The rotating washing liquid will be centrifugally thrown out between the separating disks and against the sloping surfaces, thereby forcing all adhering slime outwardly through the discharge opening and thereby washing and flushing the separating bowl. The wash water is also forced through the cream outlet 49 through the skim milk outlet 21 to aid in flushing the chambers 52 and 54 so that proper cleaning of the tinware is effected.

It is thus apparent that a simplified construction has been provided for a self-washing cream separator which achieves the objects of this invention. The complete and efficient washing of the separating bowl and its associated parts is accomplished. The substantially continuous discharge opening and its sealing means therefor are of prime importance in that they present a construction wherein a positive flushing and washing of all parts of a separating bowl can be obtained by virtue of the centrifugal action of the bowl itself.

It is to be understood that modifications may be made which do not depart from the spirit of the invention as disclosed nor as defined within the scope of the appended claims.

What is claimed is:

1. A centrifugal separator comprising in combination with a rotatable bowl, a pack of frustoconical disks disposed in said bowl in spaced superposed relationship, the inner peripheral edges of said disks defining a substantially cylindrical space extending axially of said bowl, said disks being provided with a series of alined openings spaced from the inner edges of the disk, a distributor disposed at the bottom of said bowl and having discharge outlets communicating with said openings, said distributor being provided with a central inlet opening at the bottom of the cylindrical space formed by said disks in communication with said discharge outlets, a milk inlet tube communicating with said opening and carried for rotation with the bowl, said tube being of substantially less cross sectional diameter than the inner edges of the disks thereby defining a substantially wide annular space extending substantially the entire axial extent of the disks, an outlet conduit formed in the lower portion of said bowl adjacent to the milk inlet tube, said conduit communicating with said annular space to provide means for removing cream from said space, means to deliver milk to said tube, and means to deliver washing liquid to said tube and to said annular space.

2. A centrifugal separator comprising in combination with a rotatable bowl, a pack of frustoconical disks disposed in said bowl in spaced superposed relationship, the inner peripheral edges of said disks defining a substantially cylindrical space extending axially of said bowl, said disks being provided with a series of alined openings spaced from the inner edges of the disks, a distributor disposed at the bottom of the bowl, said distributor having discharge outlets communicating with said openings, and being provided with a central inlet opening at the bottom of the cylindrical space formed by the disks, said inlet opening being in communication with said discharge outlets, a milk inlet tube communicating with said opening and carried for rotation with the bowl, said tube being of substantially less diameter in cross section than the inner edges of the disks thereby defining a substantially wide annular space extending substantially the entire axial extent of the disks, a conduit means formed in the lower portion of said bowl adjacent to said milk inlet tube and said discharge outlets, said conduit means being in communication with said annular space to provide a cream discharge outlet, means to deliver milk to said tube, and means to deliver washing liquid to said tube and to said annular space.

3. A centrifugal separator comprising in combination with a rotatable bowl, a pack of frustoconical disks disposed in said bowl in spaced superposed relationship, means for securing said disks to the bowl at their outer edges, the inner edges of said disks being continuous with unobstructed annular spaces therebetween and collectively defining a substantially cylindrical space extending axially of said bowl, said disks being provided with a series of alined openings spaced from the inner edges of the disks, a distributor disposed at the bottom of the bowl, said distributor having discharge outlets communicating with said openings and being provided with a central inlet opening at the bottom of the cylindrical space formed by the disks, a milk inlet tube communicating with said opening and carried for rotation with the bowl, the outside wall of said tube being an uninterrupted surface of revolution; being concentric with respect to the inner edges of the disks; and being of substantially less diameter thereby defining with said edges an unobstructed annular space extending substantially the entire axial extent of the disks, a conduit formed in the lower portion of the bowl adjacent to said milk inlet tube and communicating with said annular space to provide means for the removal of cream from said space, means for delivering milk to said tube, and means to deliver washing liquid to said tube and to said annular space.

4. The combination with a centrifugal separator having a rotatable bowl, of means for supplying liquid to be treated and washing liquid to said bowl comprising, a supply can positioned above said bowl, a discharge tube projecting from said can and in axial alinement with said bowl, a milk feed tube axially positioned within said discharge tube, said milk feed tube being of substantially less cross-sectional diameter than said discharge tube, thereby providing a washing liquid opening and a milk feed opening within said discharge tube, a sealing member connected to said milk feed tube for closing said discharge tube during the separating operation of said bowl, and means for displacing said milk feed tube and said sealing member to permit an unrestricted discharge of washing liquid through said washing liquid opening and to said bowl.

5. The combination with a centrifugal separator having a rotatable bowl, of means for supplying liquid to be treated and washing liquid to said bowl comprising, a supply can positioned above said bowl, a discharge tube projecting from said can for communication with said bowl, a milk feed tube axially positioned within said discharge tube, said milk feed tube being of substantially less cross-sectional diameter than said discharge tube, thereby providing a washing liquid opening and a milk feed opening within said discharge tube, a sealing member connected to said milk feed tube for closing said discharge opening during the separating operation of said bowl, and means for axially displacing said milk feed tube and said sealing member to permit an unrestricted discharge of washing liquid through said washing liquid opening and to said bowl.

6. The combination with a centrifugal separator having a rotatable bowl, of means for supplying liquid to be treated and washing liquid to said bowl comprising, a supply can, a discharge tube positioned for communication with said bowl, a feed tube axially positioned within said discharge tube, a shoulder portion connected to said feed tube, said shoulder portion providing a seal for sealing said discharge tube, a pair of upstanding leg members connected to said feed tube, a float member rotatably positioned between said leg members, said float member being rotatable from a vertical to a horizontal position, a sealing member connected to said float member for sealing said feed tube in the vertical position of said float member, and a metering surface provided on said float member, said surface cooperating with said feed tube to control the flow of liquid through said feed tube during rotation of said float member.

7. The combination with a centrifugal separator having a rotatable bowl, of means for supplying liquid to be treated and washing liquid to said bowl comprising, a supply can, a discharge tube on said can in communication with said bowl, a feed tube axially positioned within said discharge tube, a shoulder portion connected to said feed tube for normally closing said discharge tube, upstanding members connected to said feed tube, a handle member pivotally connected to said upstanding members and vertically movable with respect thereto, a seal connected to said handle member for normally closing said feed tube, and means connected between said handle portion and said feed tube for limiting vertical movement therebetween, said handle member being vertically movable to respectively open said feed tube and said discharge tube.

8. The combination with a centrifugal separator having a rotatable bowl, of means for supplying liquid to be treated and washing liquid to said bowl comprising, a supply can, a discharge tube on said can for communication with said bowl, a feed tube positioned within said discharge tube, a shoulder portion connected to said feed tube for normally closing said discharge tube, upstanding leg members connected to said feed tube, a handle member pivotally connected to said upstanding leg members and vertically movable with respect thereto, a seal connected to said handle member for normally closing said feed tube, and means for limiting vertical movement therebetween, said handle member being vertically movable to respectively open said feed tube and said discharge tube.

9. The combination with a centrifugal separator having a rotatable bowl, of means for supplying liquid to be treated and washing liquid to said bowl comprising, a supply can, a discharge tube on said can for communication with said bowl, a feed tube axially positioned within said discharge tube, a shoulder portion connected to said feed tube for normally closing said discharge tube, a float member rotatably connected to said feed tube, a seal connected to said float member for normally closing said feed tube, means for axially displacing said float member for opening said feed tube, and means for axially displacing said shoulder portion from said discharge tube to open the same.

10. The combination with a centrifugal separator having a rotatable bowl, of means for supplying liquid to be treated and washing liquid to said bowl comprising, a supply can, a discharge tube on said can for communication with said bowl, a feed tube axially positioned within said discharge tube, a shoulder portion connected to said feed tube for normally closing said discharge tube, an upstanding member connected to said feed tube, a valve member rotatably connected to said feed tube for movement from a vertical to a horizontal position, a sealing plug connected to said valve member normally sealing said feed tube, said sealing plug being displaceable upon rotation of said valve member, and a closed tubular handle member connected to said valve member, said handle member constituting a float for regulating said valve member and the discharge of liquid through said feed tube upon the rotation of said valve member.

11. The combination with a centrifugal separator having a rotatable bowl, of means for supplying liquid to be treated and washing liquid to said bowl comprising a supply can, a discharge tube on said can for communication with said bowl, a feed tube axially positioned within said discharge tube, a shoulder portion connected to said feed tube for normally closing said discharge tube, upstanding leg members connected to said feed tube, a valve member rotatably connected to said feed tube for movement from a vertical to a horizontal position, a sealing plug connected to said valve member for normally sealing said feed tube, said sealing plug being displaceable upon rotation of said valve member, a closed tubular handle member connected to said valve member, said handle member constituting a float for regulating said valve member and the discharge of liquid through said feed tube upon the rotation of said valve member, and means for axially moving said handle member for displacing said sealing plug and said shoulder portion thereby opening said feed tube and said discharge tube.

12. The combination with a centrifugal separator having a rotatable bowl, of means for supplying liquid to be treated and washing liquid to said bowl comprising, a supply can, a discharge tube on said can for communication with said bowl, a feed tube axially positioned within said discharge tube, a shoulder portion connected to said feed tube for normally closing said discharge tube, a valve member rotatably connected to said feed tube for normally closing the same, said valve member having a metering surface thereon for cooperation with said feed tube, and a float member connected to said valve member, said float member being axially displaceable for opening said feed tube and said discharge tube, and rotatable for regulating said metering surface to control the flow of liquid through said feed tube.

13. A centrifugal separator comprising a rotatable bowl, means for driving said bowl, a pack of frusto-conical disks positioned for rotation within said bowl in spaced superposed relationship, the inner peripheral edges of said disks defining a substantially cylindrical space extending axially of the bowl, a milk inlet tube positioned centrally within the cylindrical space and connected to said bowl for rotation therewith, said milk inlet tube having its upper end terminating within the bowl, the outer peripheral surface of said tube being of substantially less diameter than the cylindrical space formed by the inner peripheral edges of said disks thereby forming a wide space annular in horizontal cross section which is uninterrupted inwardly at least to the outer peripheral surface of said inlet tube, and means for supplying washing liquid to said space whereby a column of washing liquid of substantially thick width in radial cross section is built up directly adjacent the inner peripheral edges of said disks, said washing liquid being centrifugally forced outwardly between the disks upon rotation of said bowl.

14. A centrifugal separator comprising a rotatable bowl, means for driving said bowl, a pack of frusto-conical disks positioned for rotation within said bowl in spaced superposed relationship, the inner peripheral edges of said disks defining a substantially cylindrical space extending axially of the bowl, a milk inlet tube positioned centrally within the cylindrical space and connected to said bowl for rotation therewith, the outer peripheral surface of said tube being of substantially less diameter than the cylindrical space formed by the inner peripheral edges of said disks thereby forming a wide space annular in horizontal cross section which is uninterrupted inwardly at least to the outer peripheral surface of said inlet tube, means for supplying washing liquid to said space whereby a column of washing liquid of substantially thick width in radial cross section is built up directly adjacent the inner peripheral edges of said disks, said washing liquid being centrifugally forced outwardly between the disks upon rotation of said bowl, a substantially continuous discharge opening formed in the periphery of said bowl, and centrifugal valve means for controlling the discharge of washing liquid through said opening.

15. A centrifugal separator having a rotatable bowl comprising in combination, an upper bowl portion and a lower bowl portion, each of said bowl portions having an inclined inner surface converging with the other at a maximum internal periphery, a pack of frusto-conical disks mounted for rotation within said bowl, a plurality of circumferentially spaced wing portions connected to one of said bowl portions, said wing portions engaging the outer peripheral edges of said disks for supporting the same within said bowl, a plurality of spacer elements positioned at the inner maximum periphery between said bowl portions to space said portions in opposed relationship, thereby forming a substantially unrestricted and continuous circumferentially extending discharge opening, said bowl portions also including annular sealing surfaces adjacent said discharge opening, a circumferentially extending resilient member positioned adjacent to and away from said opening, said wing portions including portions for supporting said resilient member, and means for rotating said bowl whereby said resilient member is compressed against the sealing surfaces for sealing said substantially continuous opening under the action of centrifugal force.

16. A centrifugal separator comprising a rotatable bowl, a milk feed tube projecting axially with respect to the bowl, a pack of separating disks disposed in the bowl in superposed relationship, the inner peripheral edges of said disks defining a substantially wide cylindrical space which is uninterrupted inwardly at least to a zone which is coextensive with the projection of the feed tube, a washing liquid discharge opening disposed in a peripheral portion of the bowl, a centrifugally operable valve means positioned adjacent the discharge opening for regulating the discharge of washing liquid from the bowl, means for supplying a washing liquid to said wide cylindrical space whereby a substantially thick column of washing liquid is built up in said space adjacent the inner peripheral edges of said disks, and a cream outlet positioned in a bottom portion of the bowl, said outlet being in communication with the cylindrical space for receiving and discharging washing liquid from said space.

17. A centrifugal separator comprising in combination, a supply can, a rotatable bowl, a pack of frusto conical disks disposed in said bowl in superposed relationship, the inner peripheral edges of said disks defining a cylindrical space extending axially of the bowl, a milk inlet tube positioned axially within said space for supplying whole milk to a said disk pack, said inlet tube being of substantially less horizontal cross sectional width than the cylindrical space thereby forming a substantially wide annular space which is uninterrupted inwardly at least to the outer peripheral surface of said inlet tube, a discharge tube projecting from said supply can, a milk feed tube axially positioned within said discharge tube for supplying whole milk to said inlet tube, said milk feed tube being of substantially less cross-sectional diameter than said discharge tube to provide a washing liquid opening and a milk supply opening, said washing liquid opening being axially positioned with respect to said wide annular space, and means including a valve movable to regulate the supply of washing liquid to said washing liquid opening whereby a column of washing liquid wide in cross section is built up in the wide annular space adjacent the peripheral edges of said disks.

18. A centrifugal separator having a rotatable bowl, a pack of separating disks disposed within said bowl in superposed relation, the inner peripheral edges of said disks defining a cylindrical space extending axially of said bowl, means for supplying whole milk and washing fluid to said bowl including, a supply can, a discharge tube projecting from said supply can, a milk feed tube axially projecting within said discharge tube for supplying whole milk to said bowl, said feed tube being of substantially less cross-sectional diameter than said discharge tube thereby providing a washing liquid opening and a milk feed opening within said discharge tube, valve means for regulating the discharge of washing liquid through said washing liquid opening to said cylindrical space, said cylindrical space being uninterrupted inwardly at least to a zone which is substantially co-extensive with the projection of the feed tube whereby a thick column of washing liquid is built up in the cylindrical space adjacent the inner peripheral edges of said disks.

19. A centrifugal separator comprising in combination with a rotatable bowl, a milk feed tube projecting axially with respect to the bowl, a pack of separating disks disposed in said bowl in superposed relationship, the inner edges of said disks defining a substantially wide cylindrical space which is uninterrupted inwardly at least to a zone which is coextensive with the projection of the feed tube, said milk feed tube projecting substantially toward said space and being of substantially less cross-sectional diameter than the cylindrical space thereby providing an annular opening wide in horizontal cross-section around the tube at the top of the cylindrical space, and means for supplying washing liquid through said wide annular opening whereby a wide column of washing liquid is built up within the space adjacent the inner peripheral edges of the disks.

20. A centrifugal separator comprising in combination with a rotatable bowl, a milk feed tube projecting axially with respect to said bowl, a pack of separating disks disposed in said bowl in superposed relationship, the inner edges of said disks defining a substantially wide cylindrical space, said space being uninterrupted inwardly at least to a zone which is coextensive with the projection of the feed tube, a milk distributor provided in said bowl, said distributor having an opening in communication with the cylindrical space, said milk feed tube extending substantially near said cylindrical space and being of substantially less cross-sectional diameter than said cylindrical space thereby providing an annular opening wide in horizontal cross-section around the tube adjacent the top of the cylindrical space, and means for supplying washing liquid through the annular opening to said cylindrical space.

21. A centrifugal separator having a rotatable bowl comprising, in combination, an upper bowl portion and a lower bowl portion, each of said bowl portions having an inclined inner surface converging with the other at a maximum internal periphery, a pack of frusto-conical disks mounted for rotation within said bowl, a plurality of circumferentially spaced wing portions connected to one of said bowl portions, said wing portions engaging the outer peripheral edges of said disks for supporting the same within said bowl, a substantially annular discharge opening at the maximum internal periphery of the bowl portion, said bowl portions also including annular sealing surfaces adjacent said discharge opening, a circumferentially extending resilient member positioned adjacent to and away from said opening, said wing portions including portions for supporting said resilient member, and means for rotating said bowl whereby said resilient member is compressed against the sealing surfaces for sealing said substantially continuous opening under the action of centrifugal force.

22. The combination with a centrifugal separator having a rotatable bowl, a supply can for supplying whole milk to said bowl, a milk feed tube on said supply can communicating with said bowl, a valve member connected to said feed tube for rotation about a horizontal axis, said valve member having one portion for normally closing the feed opening, said valve member having a second portion serving as a metering surface cooperating with the feed tube, and a float member connected to said valve member, said float member being rotatable upon the lowering of the liquid level within the supply can for moving the metering surface with respect to the milk feed tube thereby controlling the flow of liquid from said supply can through said tube.

WILLIAM H. HARSTICK.

REFERENCES CITED

The following references are of record in the file of this patent:

UNITED STATES PATENTS

| Number | Name | Date |
| --- | --- | --- |
| 439,173 | Newberg | Oct. 28, 1890 |
| 743,428 | Beckman | Nov. 10, 1903 |
| 1,019,836 | Reid | Mar. 12, 1912 |
| 1,212,168 | Anker-Holth | Jan. 16, 1917 |
| 1,751,982 | Dunham | Mar. 25, 1930 |
| 2,091,329 | Nyrop | Aug. 31, 1937 |
| 2,173,579 | Fawcett | Sept. 19, 1939 |
| 2,173,580 | Fawcett | Sept. 19, 1939 |
| 2,313,260 | Persoons et al. | Mar. 9, 1943 |
| 2,313,540 | Hall | Mar. 9, 1943 |
| 2,313,541 | Flowers | Mar. 9, 1943 |

FOREIGN PATENTS

| Number | Country | Date |
| --- | --- | --- |
| 20,139 | Sweden | Feb. 16, 1904 |
| 28,774 | Sweden | Apr. 14, 1905 |
| 23,115 | Great Britain | Nov. 11, 1912 |
| 253,917 | Great Britain | Feb. 3, 1927 |
| 576,524 | Germany | May 11, 1933 |